United States Patent [19]

Son et al.

[11] Patent Number: 4,525,285

[45] Date of Patent: Jun. 25, 1985

[54] METHOD OF PREVENTING LOSS OF AN OIL-BASE DRILLING FLUID DURING THE DRILLING OF AN OIL OR GAS WELL INTO A SUBTERRANEAN FORMATION

[75] Inventors: Adelina J. Son; Royal E. Loftin, both of Houston, Tex.

[73] Assignee: Halliburton Company, Duncan, Okla.

[21] Appl. No.: 528,326

[22] Filed: Aug. 31, 1983

[51] Int. Cl.$^3$ .................................................. C09K 7/06
[52] U.S. Cl. ............................. 252/8.5 M; 252/8.5 P
[58] Field of Search ......................... 252/8.5 M, 8.5 P

[56] References Cited

U.S. PATENT DOCUMENTS

| | | |
|---|---|---|
| 2,024,119 | 12/1935 | Vietti et al. . |
| 2,079,431 | 5/1937 | Cannon . |
| 2,090,626 | 8/1937 | Grebe . |
| 2,208,766 | 7/1940 | Lawton . |
| 2,297,660 | 9/1942 | Mazee . |
| 2,302,913 | 11/1942 | Reimers . |
| 2,497,398 | 2/1950 | Dawson ............................... 252/8.5 |
| 2,623,015 | 12/1952 | Fischer . |
| 2,786,530 | 3/1957 | Maly . |
| 2,999,063 | 9/1961 | Hoeppel ............................... 252/8.5 |
| 3,017,349 | 1/1962 | Fischer . |
| 3,085,976 | 4/1963 | Phansalkar et al. . |
| 3,125,517 | 3/1964 | Voda ................................... 252/8.5 |
| 3,141,501 | 7/1964 | Bernard et al. . |
| 3,175,611 | 3/1965 | Hower . |
| 3,318,380 | 5/1967 | Tenny . |
| 3,435,899 | 4/1969 | McLaughlin et al. . |
| 3,639,233 | 2/1972 | Schulz et al. . |
| 3,656,550 | 4/1972 | Wagner et al. . |
| 3,658,131 | 4/1972 | Biles . |
| 3,701,384 | 10/1972 | Routson et al. . |
| 3,729,052 | 4/1973 | Caldwell . |
| 3,865,189 | 2/1975 | Friedman . |
| 3,866,684 | 2/1975 | Friedman . |
| 3,866,685 | 2/1975 | Friedman . |
| 3,876,007 | 4/1975 | Christopher . |
| 3,882,938 | 5/1975 | Bernard . |
| 4,004,639 | 1/1977 | Sandiford . |
| 4,069,869 | 1/1978 | Sandiford . |
| 4,081,029 | 3/1978 | Holm . |
| 4,140,183 | 2/1979 | Holm . |
| 4,233,162 | 11/1980 | Carney ................................. 252/8.5 |
| 4,257,483 | 3/1981 | Morris et al. . |
| 4,296,811 | 10/1981 | Morris et al. . |
| 4,301,867 | 11/1981 | Sydansk et al. . |

*Primary Examiner*—Herbert B. Guynn
*Attorney, Agent, or Firm*—Thomas R. Weaver; Edward F. Sherer

[57] ABSTRACT

A method of drilling a well bore into a subterranean formation containing water with monovalent and polyvalent cations and preventing leak-off into the formation of an oil-base drilling fluid used in the drilling. The method is carried out by adding to an oil-base fluid comprising an oil, water, a weighting agent and an emulsifying agent, a powdered seepage loss reducer selected from the group consisting of an amorphous silicate having a molecular ratio of silicon dioxide to alkali metal oxide in the range of from about 1.5:1 to about 3.3:1 wherein the alkali metal is selected from the group consisting of sodium, potassium, and mixtures thereof, an ammonium soap of a fatty acid having from about 12 to about 22 carbon atoms and mixtures thereof to form the drilling fluid and circulating the drilling fluid containing the powdered seepage loss reducer in the well bore. When the circulation of the drilling fluid containing the seepage loss reducer takes place, the compound reacts with the monovalent and polyvalent cations contained in the formation to form a seal in the formation adjacent to the well bore.

14 Claims, 2 Drawing Figures

METHOD OF PREVENTING LOSS OF AN OIL-BASE DRILLING FLUID DURING THE DRILLING OF AN OIL OR GAS WELL INTO A SUBTERRANEAN FORMATION

BACKGROUND OF THE INVENTION

1. Field of the Invention

The present invention relates to a method of limiting and localizing the penetration of an oil-base drilling fluid into porous underground strata, crevices, and fissures during the drilling of a well in a permeable subterranean formation.

2. Description of the Prior Art

In the drilling of a well into the earth by rotary drilling techniques, a drill bit is attached to a drill string and the drill bit is rotated in contact with the earth to cut and break the earth and form a well therein. A drilling fluid is circulated between the surface of the earth and the bottom of the well to remove drill cuttings therefrom, lubricate the bit and drill string, and to apply hydrostatic pressure to the well to control the flow of fluids into the well from the earth formation penetrated by the well.

Drilling fluids commonly employed include gaseous and liquid drilling fluids. Liquid drilling fluids, often called "drilling muds" may have a liquid base which is water or an oil-base which is a hydrophobic substance such as oil. This invention relates to the latter and includes, as is common in the art, a minor portion of water present in the oil as an emulsion of the water-in-oil (invert) type.

In the drilling of a well into the earth, a problem sometimes occurs which involves the loss of unacceptably large amounts of drilling fluid into strata, crevices, and fissures of a formation penetrated by a well. This is sometimes referred to as "lost circulation". Such a formation or portion thereof that accepts the drilling fluid is commonly termed a "lost circulation zone". Lost circulation may occur when the well encounters a formation of an unusually high permeability or one which has naturally occurring fractures or fissures. Lost circulation may also occur by the inadvertent fracturing of a formation during drilling operations. Such fracturing sometimes occurs when the density of the mud is increased to provide a sufficiently high hydrostatic pressure to control high formation pressures. Other inadvertent fracturing of formations sometimes occurs because of fluctuations of the hydrostatic pressure imposed on the formations due to movements of the drill string and well casing in a well.

In addition to lost circulation, filtration and/or seepage losses are commonly encountered drilling problems. Seepage is a problem primarily incurred while spudding in though it may continue during the entire drilling phase as well.

Oil-base drilling fluids are generally more expensive than water-base drilling fluids. This added expense is justified for a number of reasons. One such reason is that oil-base fluids prevent formation damage to water sensitive reservoirs and prevent hole enlargement and permit coring in water-soluble rocks, such as salt. In addition, oil-base drilling fluids maintain stable mud properties in deep and high temperature holes which require heavy mud. Further, these fluids prevent corrosion of the drill pipe, casing, and tubing which reduces expensive workovers. They usually allow an increased drilling rate because of better lubrication and removal of the shell cuttings without disintegration of the cuttings. Another advantage with oil-base drilling fluids is that they generally can be reclaimed for a later use and this reduces the overall cost.

It is desirable for a number of reasons to reduce the loss of a drilling fluid during a drilling operation. For instance, oil-base drilling fluids are expensive and their loss can appreciably increase the cost of a drilling operation. In addition, if the oil-base fluids wet the formation by leakage during the drilling operation, the result can lead one to believe that the formation is a producing formation.

The reduction in seepage loss of a drilling fluid has been a long standing problem with drilling fluids and various methods have been used in the past to alleviate this problem. For example, U.S. Pat. No. 4,222,444 discloses the use of magnetic material to reduce the amount of drilling fluid lost to a formation. Also U.S. Pat. No. 3,509,951 discloses the use of a wax emulsion to control the loss of a drilling fluid while drilling a well. In addition, fibrous materials have been used in drilling fluids in order to form a sheath on the formation surface and prevent the loss of the drilling fluid into the formation.

SUMMARY OF THE INVENTION

The present invention is a method of drilling a well bore into a subterranean formation containing water with monovalent and polyvalent cations and preventing leak-off into the formation of an oil-base drilling fluid used in the drilling. The method is carried out by adding to the oil-base fluid a seepage loss reducer selected from the group consisting of a powdered silicate having a molecular ratio of silicon dioxide to alkali metal oxide in the range of from about 1.5:1 to about 3.3:1 wherein the alkali metal is selected from the group consisting of sodium, potassium, and mixtures thereof, an ammonium soap of a fatty acid having from about 12 to about 22 carbon atoms, and mixtures thereof to form the drilling fluid and circulating the drilling fluid containing the seepage loss reducer in the well bore. When the circulation of the drilling fluid containing the seepage loss reducer takes place, the compound reacts with any monovalent and polyvalent cations contained in the formation to form a seal in the formation adjacent to the well bore.

DESCRIPTION OF THE PREFERRED EMBODIMENTS

Figure 1:
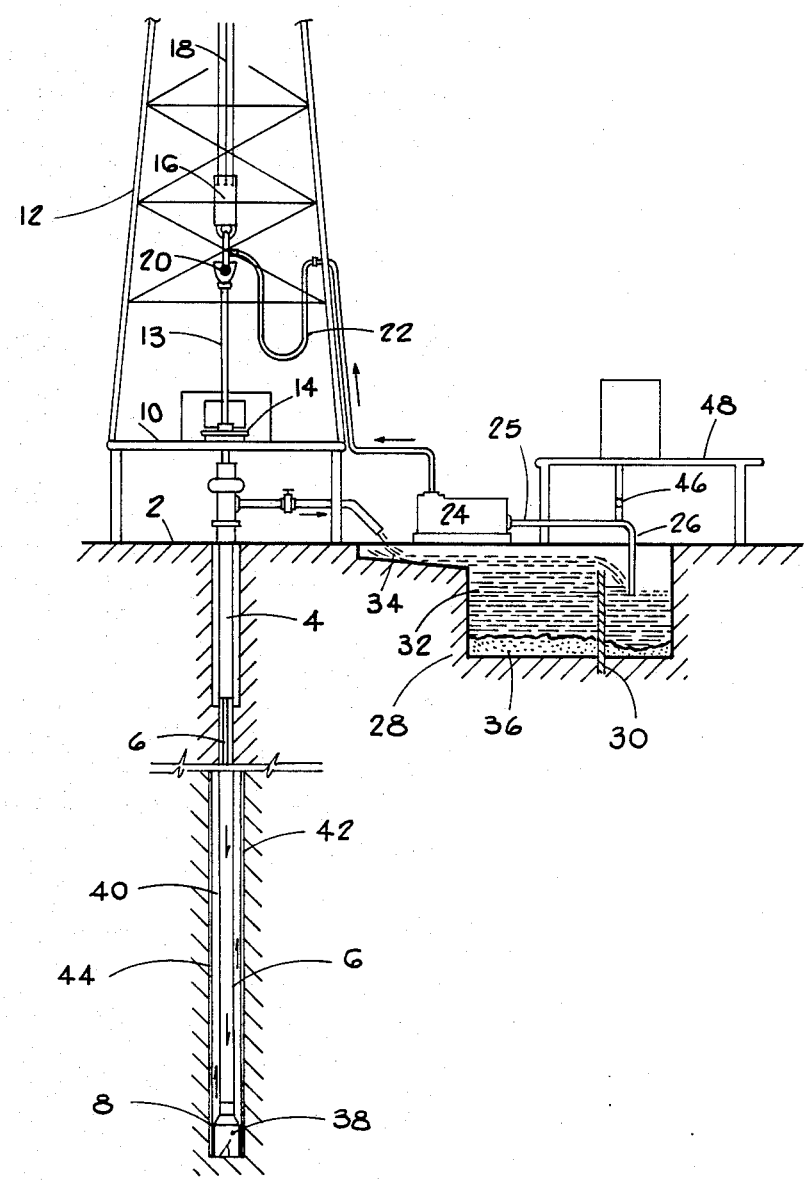
FIG. 1 is a representation of the method of the invention.

The present invention provides a method of alleviating the loss of an oil-base drilling fluid into a subterranean formation that contains monovalent and polyvalent cations and is penetrated in the drilling of a well. The method has particular application in controlling partial lost circulation or seepage when drilling with oil-base fluids and is hereafter described with reference to such fluids.

The oil-base drilling fluid used to carry out the method of the present invention has a density of from about 8.0 to about 25.0 pounds per U.S. gallon and comprises an oil-base liquid comprising from about 60.0 to about 99.0 percent by volume of oil and from about 1 to about 40 percent by volume of water, a weighting agent present in an amount sufficient to produce a drilling fluid having a density of from about 8.0 to about 25.0 pounds per U.S. gallon, from about 1.0 to about 9.0 percent by weight of an emulsifying agent (based on the combined weight of the oil-base liquid which comprises the oil and the water, and the weighting agent) and a seepage loss reducer.

The seepage loss reducer used to carry out the method of the present invention is selected from the group consisting of a powdered silicate having a molar ratio of silicon dioxide to alkali metal oxide in the range of from about 1.5:1 to about 3.3:1 wherein the alkali metal is selected from the group consisting of sodium, potassium, and mixtures thereof, and an ammonium soap of a fatty acid having from about 12 to about 22 carbon atoms. The oil-base drilling fluid containing the seepage loss reducer is circulated in the well bore and the seepage loss reducer reacts with the monovalent and polyvalent cations such as sodium, magnesium, or calcium, in the subterranean formation to form a seal in the formation adjacent to the well bore.

The silicate compounds that can be employed in the method described herein have a molar ratio of silicon dioxide to alkali metal oxide in the range of from about 1.5:1 to about 3.3:1. To improve the sealing ability of the silicon dioxide, it is desirable to have a high ratio of silicon dioxide to alkali metal oxide. Such a high ratio also reduces the amount of alkali metal oxide that must be neutralized to produce gelling and sealing. Higher ratios are generally more difficult to dissolve.

Therefore, it is preferable to maintain the molar ratio of silicon dioxide to alkali metal oxide in the range of from about 2.0:1 to about 2.7:1. Most preferably, the ratio of silicon dioxide to alkali metal oxide is maintained at a ratio of about 2.5:1. Silicates of such ratio have short dissolution times while still having relatively high silicon dioxide densities.

In order to be rapidly dissolvable, the powdered silicate is preferably partially hydrated. Over-hydration or under-hydration, however, produces a less satisfactory powder. Over-hydration (more than about 20% water content by weight) produces amorphous particles which tend to flow and slowly convert to crystalline silicate which is slowly soluble. Under-hydration (less than about 12% water content by weight) results in particles which are crystalline initially and, therefore, are difficult to dissolve. Most preferably, the partially hydrated powdered silicate of the present invention has a water content in the range of from about 14% to about 16% by weight of the hydrated silicate. Amorphous particles with this hydration are relatively stable and are easily dissolved.

The silicate of the present invention is preferably comprised of amorphous particles of the partially hydrated silicate. Crystalline particles are not readily dissolvable.

In the silicates of the present invention, either sodium or potassium or mixtures thereof can be utilized as the alkali metal in the silicate. The silicate of the present invention can be represented by the formula $SiO_2:M_2O$. As stated above, M is selected from the group consisting of sodium, potassium and mixtures thereof. Other alkali metals, such as lithium and rubidium are not suitable because of their significantly different properties.

In the preparation of the rapidly dissolvable powdered silicate of the present invention, dehydration by heating a solution of appropriate silicon dioxide-alkali metal oxide ratio is not suitable. Dehydration by heating or boiling of such a solution produces a stable silicate which is only very slowly soluble.

To produce a rapidly dissolvable powdered silicate, two methods are appropriate. The first method consists of spray drying a silicate solution having a temperature less than 100° F. The spray drying produces a powder of amorphous glass particles. Furthermore, it allows production of a partially hydrated powdered silicate having a water content in the range of from about 14% to about 16% by weight of the hydrated silicate. As stated above, this range of partial hydration and the amorphous glass quality of the particles have a significant effect upon the ability of the silicate to dissolve.

In producing the powdered silicate by spray drying, a silicate solution having a desired ratio of silicon dioxide to alkali metal oxide in the range of from about 1.5:1 to about 3.3:1 is prepared and maintained at a temperature lower than 110° F. and preferably lower than 85° F. This solution is delivered to a spray drying device which produces rapid cooling and rapid dehydration of small droplets of the solution. In the process of rapidly cooling and dehydrating, the droplets pass from an equilibrium to a non-equilibrium state such that an easily soluble amorphous glass particle is formed. The cooling and dehydration must be rapid enough to prevent the silicate from being converted to a slowly soluble crystal state. If necessary, the solution can be refrigerated and the spray directed against a cooled baffle or the like.

The second method of preparing the rapidly dissolvable powdered silicate also utilizes rapid dehydration at a relatively low temperature. In this method, however, dehydration is achieved by adding a dehydration agent to the silicate solution of the appropriate ratio. During the dehydration, the solution must be maintained at a temperature less than 110° F. and preferably less than 85° F. Furthermore, to avoid crystallization and agglomeration of some of the amorphous particles, it is necessary to rapidly shear the solution as the dehydration agent is added. Preferred dehydration agents include ethanol, methanol and acetone. Less suitable are isopropyl alcohol, butyl alcohol, and ethylene glycol monobutyl ether. Also less suitable are saturated salt solutions such as those of sodium chloride and potassium chloride.

As a dehydration agent such as ethanol is added to the silicate solution undergoing rapid shearing, particles of partially hydrated amorphous silicate are precipitated from the silicate solution. These particles are separated from the liquid and then dried without heating. For example, additional alcohol can be added to the particles and then allowed to evaporate at room temperature.

In either the spray drying or precipitation methods, trace amounts of lithium and copper can be added to help prevent crystallization of the silicates. Lithium provides an undersized atomic particle and copper provides an oversized atomic particle to assist in breaking up crystalline patterns as they form. Other suitable undersized or oversized atomic particles can be utilized.

In order to be rapidly dissolvable, it is desirable to have the amorphous particles of the powdered silicate smaller than 40-mesh size. If a significant number, 10% for example, of particles are larger than 40-mesh size, field use is hampered. To arrive at a powder having less than 40-mesh size, the powder resulting from the preparation methods can be screened or ground until the appropriate size is achieved. Also, the particle size can be controlled in the formation process of spray drying or precipitation with methods that are well known.

By utilizing the powdered silicate of the present invention, an improved method of preventing leak-off into the formation of an oil-base drilling fluid is achieved. If desired, the powdered silicate can be stored at the well location prior to its use. Furthermore, the storage of the silicate can occur at temperature below freezing without adverse effect to the powdered silicate material.

Potassium silicate is less reactive with calcium and other di- and polyvalent ions than sodium silicate, but gelling still results upon combination with a sufficient amount of these agents or a sufficient amount of reaction time. The slower gelling time and higher concentration of gelling agent or catalyst can, therefore, be utilized to produce gelling at a desired time or location where sodium silicate would not be suitable.

The ammonium soaps of the fatty acids that are used as the seepage loss reducer used in carrying out the method of the present invention generally comprise fatty acids having from about 12 to about 22 carbon atoms and preferably about 16 to about 18 carbon atoms. Further, both solid and oil dispersed ammonium soaps of the fatty acids may be used in the present invention. Examples of ammonium soaps of fatty acids that can be used to carry out the method of the invention include unsaturated fatty acids such as palmitoleic acid, oleic acid, ricinoleic acid, linoleic acid, linolenic acid, eleostearic acid, gadoleic acid, erucic acid, and saturated fatty acids such as lauric acid. The preferred fatty acids are oleic acid, ricinoleic acid and palmitoleic acid.

The preferred seepage loss reducer is powdered silicate.

The oil used in the drilling fluid of the present invention are well known in the art and include substantially all hydrocarbon materials such as crude oil, both sweet and sour, a partially refined fraction of crude oil (e.g. side cuts from crude columns, crude column overheads, gas oils, kerosene, heavy naphthas, naphthas, straight-run gasoline, liquified petroleum gases); refined fractions of crude oil (propane, butane, pentane, decane, etc.) and synthesized hydrocarbons including halogenated hydrocarbons. From an economical standpoint, the hydrocarbon is preferably a partially refined fraction of crude oil (e.g. diesel fuel, mineral oil, or a gasoline cut-off of a crude column). The invention, however is not limited to any particular type of oil or mixtures thereof.

An emulsifying agent is used to carry out the method of the present invention. Preferably the emulsifying agent comprises a fatty acid or an amide derivative of a fatty acid. These emulsifying agents are disclosed in U.S. Pat. No. 4,233,162 which is herein incorporated by reference. Specific examples of suitable saturated fatty acids are capric, lauric, myristic, palmitic, stearic, and behenic acids. Suitable unsaturated fatty acids are monoethenoid acids, such as caproleic, lauroleic, myristoleic, palmitoleic, oleic, and cetoleic acids, diethanoid acids, such as linoleic acid; and triethenoid acids, such as linolenic acid. From a commercial standpoint, mixtures of fatty acids derived from tallow, tall oil, soybean oil, coconut oil, and cottonseed oil have been found to be suitable for the practice of this invention. Most preferably, the emulsifying agent comprises a mixture of dimerized oleic acid, oleic acid and oleyl amide. Amide derivatives of the fatty acids can be prepared by methods well known in the art.

The amount of emulsifying agent used to carry out the method of the present invention will vary widely depending upon the make up of the oil-base drilling fluid, but will generally be in the range of about 0.1 to about 9.0 weight percent based on the combined weight of the oil-base liquid and weighting agents present in the oil-base drilling fluid to give the drilling fluid a density of about 8.0 to 25.0 pounds per U.S. gallon.

Referring to the drawing, numeral 4 designates a well bore drilled into the earth's surface (2) by a hollow drill string (6) drill bit (8) attached to the lower end of the drill string. The drill bit may be a rock bit or may be a drag bit or suitably may be one having rollers or conical cutters. The drill string (6) extends up the floor (10) of a derrick (12) through a rotary table (14) which is rotated by means not shown. The drill string is suspended by a block (16) hoisting lines (18) and swivel (20). Swivel (20) is connected by a flexible line (22) to a drilling mud pump (24). The mud pump (24), in turn, connects to a suction line (26) which connects to a settling basin (28) divided into two parts by a weir (30). In the section (32) of the settling 5 basin (28) the drilling mud is introduced thereto by a return ditch (34) carrying any material resulting from the drilling operation. The section (32) is of sufficient size to provide a residence time for settling of the material as a layer (36) in the bottom of the basin (28). The drilling fluid flows by lines (22) and (26) down the hollow drill string (6) and out through the eyes (38) of the drill bit (8) and up the annulus (40) to the return ditch (34).

In accordance with the present invention, the drilling fluid containing the seepage loss reducer is pumped by 15 drilling mud pump (24) through line (22) down the hollow drill string (6) into the bit (8). The drilling mud passes from the eyes (38) of the drill bit into the annulus (40). The fluid is maintained in the annulus (40) under sufficient pressure by the pump (24) to overcome the hydrostatic head of the connate water in the formation (42). At zones in the formation (42) where loss of the drilling fluid can occur, the drilling fluid containing the seepage loss reducer comes in contact with the water in the formation (42) which contains monovalent and polyvalent cations such as sodium, potassium, calcium, and magnesium. The seepage loss reducer in the fluid upon contact with the water in the formation (42) forms a solid substance (44) adjacent to the well bore. Since the seepage loss reducer is used to form a seal (44), it is at times necessary to add the seepage loss reducer to replace that which is deposited as a seal (44). One manner of adding the seepage loss reducer to the drilling fluid is by line (46) which is connected to a tank (48) which contains the seepage loss reducer.

The amount of the seepage loss reducer used in the drilling fluid will vary over a wide range depending upon the amount of connate water in the subterranean formation. Generally, however, one pound of seepage loss reducer per barrel of oil-base drilling fluid to about 25 pounds of seepage loss reducer per barrel of oil-base drilling fluid is used to carry out the method of the invention with about 5 pounds to about 10 pounds of seepage loss reducer per barrel of oil-base drilling fluid being the more preferred amount of seepage loss reducer to use with the oil-base drilling fluid.

Other additives commonly used in drilling fluids may also be included in the drilling fluid. For example, a dispersing agent, sometimes referred to as a thinning agent may be included to aiding and controlling the viscosity to better provide a pumpable mixture. Further, a weighting material may also be employed to tailor the weight of the drilling fluid. When a weighting material is employed in the method of the invention, any conventional weighting material known in the art may be employed. Examples of suitable weighting agents include barites, iron oxides, and calcium carbonates. The weighting material is employed in an effective weighting amount which can vary depending on the composition of the drilling fluid and the desired density and characteristics of the drilling fluid. Sufficient weighting material is utilized to give a final drilling fluid density of from about 8.0 to about 25.0 pounds per U.S. gallon.

The water component can be fresh water or a brine saturated or partially saturated with alkaline salts, such as calcium chloride or magnesium chloride.

The exact manner in which the seepage loss reducer which is either an ammonium soap of a fatty acid having about 12 to about 22 carbon atoms or a silicate is dispersed in the oil-base drilling fluid is not of primary importance, and if desired, the requisite amount of the seepage loss reducer may be simply added to the oil-base drilling fluid at ordinary temperatures while employing agitation or stirring to obtain a uniform drilling fluid. Additional materials, such as the emulsifying agent or weighting material can be added in the same manner. Such operations may be carried out at the well site. Sometimes it is more convenient to prepare an initial concentrate composition containing the seepage loss reducer which can be subsequently diluted with base oil to obtain the final drilling fluid. When the oil-base liquid contains a mixture of a light and heavy oil, it is preferred that the light oil be employed in forming the initial dispersion.

In practicing the invention, it is sometimes desirable to add the seepage loss reducer only when certain sections of the formation are encountered rather than making up the drilling fluid with the seepage loss reducer. During the drilling operation, the fluid is circulated and returned to a tank, pit, pump, or reservoir. This supply may be checked periodically to maintain the desired percentages of seepage loss reducer in the drilling fluid. Additional quantities of the compound may be added, if desired.

In some drilling operations, it may be desirable to operate the drill for a selected period of time using a drilling fluid without the seepage loss reducer added or with a low concentration and then after stopping the operation, circulating to the bottom of the hole the drilling fluid with a normal or high concentration of the seepage loss reducer and allowing it to remain in contact with the formation for a substantial time in order to allow the compound to react with the polyvalent cations in the formation. By way of example, drilling may be continued over a predetermined period, for example six hours, using no seepage loss reducer and then a drilling fluid containing a high concentration of the seepage loss reducer may be circulated to the bottom of the hole for treatment of the zone just drilled.

The following examples will serve to more comprehensively illustrate the principles of the invention, but is not intended to limit the bounds of the invention.

EXAMPLE I

Drilling muds were prepared in order to compare the efficiency of the drilling muds containing potassium silicate used in the method of the present invention with drilling muds not containing potassium silicate as a seepage loss reducer. The drilling muds comprised diesel oil, or mineral oil, brine water, 7-9 pounds per barrel of emulsifier and a viscosifier. Tests 1-12 contained magnesium chloride in the internal phase of the emulsion. Tests 13-18 contained calcium chloride in the internal phase of the emulsion. The potassium silicate used in the tests had a molar ratio of silicon dioxide to alkali metal oxide of about 2.5:1. The tests were determined in accordance with API RP 13B "Standard Procedure for Testing Drilling Fluids". The results of these tests are shown in Tables I and II.

TABLE I

Efficiency After 16 Hours of Hot-Rolling at 150° F.
Mud (Water-In-Oil Emulsion - 30:70 by volume)

| Test No. | Oil Used | Potassium Silicate (pounds per barrel) of mud) | Connate Water (% by volume of mud) | Screen Size Opening (microns) | Fluid Loss (cc.) |
|---|---|---|---|---|---|
| 1 | Diesel Oil | — | — | 105 | 22.6 |
| 2 | Diesel Oil | — | — | 149 | 23.0 |
| 3 | Diesel Oil | 5 | — | 105 | 3.6 |
| 4 | Diesel Oil | 5 | — | 149 | 6.2 |
| 5 | Diesel Oil | 5 | 2 | 105 | trace |
| 6 | Diesel Oil | 5 | 2 | 149 | trace |
| 7 | Mineral Oil | — | — | 105 | 41.0 |
| 8 | Mineral Oil | — | — | 149 | 40.0 |
| 9 | Mineral Oil | 5 | — | 105 | 22.0 |
| 10 | Mineral Oil | 5 | — | 149 | 10.0 |
| 11 | Mineral Oil | 5 | 2 | 105 | 0.0 |
| 12 | Mineral Oil | 5 | 2 | 149 | 0.0 |
| 13 | Mineral Oil | — | — | 105 | 24.6 |
| 14 | Mineral Oil | — | — | 149 | 25.0 |
| 15 | Mineral Oil | 5 | — | 105 | 2.4 |
| 16 | Mineral Oil | 5 | — | 149 | 6.0 |
| 17 | Mineral Oil | 5 | 2 | 105 | 0.0 |
| 18 | Mineral Oil | 5 | 2 | 149 | 0.0 |

TABLE II

Efficiency After Static - Aging at 300° F. for 4 weeks.
Mud (Water-In-Oil Emulsion - 30:70 by volume)

| Test No. | Oil Used | Potassium Silicate (pounds per barrel) of mud) | Connate Water (% by volume of mud) | Screen Size Opening (microns) | Fluid Loss (cc.) |
|---|---|---|---|---|---|
| 1 | Diesel Oil | — | — | 44 | * |
| 2 | Diesel Oil | — | — | 105 | * |
| 3 | Diesel Oil | — | — | 149 | * |
| 4 | Diesel Oil | 5 | 2 | 44 | <0.2 |
| 5 | Diesel Oil | 5 | 2 | 105 | 0.4 |

TABLE II-continued

Efficiency After Static - Aging at 300° F. for 4 weeks.
Mud (Water-In-Oil Emulsion - 30:70 by volume)

| Test No. | Oil Used | Potassium Silicate (pounds per barrel of mud) | Connate Water (% by volume of mud) | Screen Size Opening (microns) | Fluid Loss (cc.) |
|---|---|---|---|---|---|
| 6 | Diesel Oil | 5 | 2 | 19 | 2.0 |

*The mud passed freely through the screen.

EXAMPLE II

Rheological properties of muds containing potassium silicate was compared to muds not containing potassium silicate. The rheological properties were determined in accordance with API RP 13B.

The following abbreviations were used in the Table:
PV = Plastic Viscosity, and
YP = Yield Point.

The results of these tests are shown in Table III.

TABLE III

Rheology After Hot-Rolling for 16 Hours at 150° F.
Mud (Water-In-Oil Emulsion - 30:70 by volume)

| Test No. | Base Muds | Potassium Silicate (pounds per barrel of mud) | Connate Water (% by volume of mud) | PV (CPS) | YP #/100 ft.$^2$ | Gels Initial/ 10 minutes |
|---|---|---|---|---|---|---|
| 1 | Diesel Oil* | — | — | 10 | 8 | 5/9 |
| 2 | Mineral Oil* | — | — | 13 | 8 | 5/6 |
| 3 | Mineral Oil** | — | — | 17 | 11 | 13/25 |
| 4 | Diesel Oil* | 5 | — | 15 | 43 | 24/29 |
| 5 | Mineral Oil* | 5 | — | 17 | 12 | 4/6 |
| 6 | Mineral Oil** | 5 | — | 23 | 15 | 14/19 |
| 7 | Diesel Oil* | 5 | 2 | 21 | 66 | 35/37 |
| 8 | Mineral Oil* | 5 | 2 | 24 | 12 | 8/12 |
| 9 | Mineral Oil** | 5 | 2 | 29 | 13 | 17/20 |

*Contained magnesium chloride in the internal phase of the emulsion.
**Contained calcium chloride in the internal phase of the emulsion.

EXAMPLE III

The ammonium soap of the fatty acid used in the present invention can be prepared in any one of the following ways:

Method A: 100 grams of the fatty acid are added to the boiling flask. 30 grams of ammonium hydroxide are next added to the flask. The mixture is refluxed for one hour and the ammonium soap of the fatty acid is removed.

Method B: A concentrate of the ammonium soap of the fatty acid is prepared by blending 173.25 ml. of diesel oil, 103.25 ml. of oleic acid, 50.75 ml. of nonylphenoxypolyethyleneoxyethanol and 22.75 ml. of ammonium hydroxide.

Method C: A concentrate of the ammonium soap of the fatty acid is prepared by blending 103.25 ml. of oleic acid, 50.75 ml. of nonylphenoxypolyethyleneoxyethanol and 22.75 ml. of ammonium hydroxide.

EXAMPLE IV

Drilling muds were prepared in order to compare the efficiency of the drilling muds containing an ammonium soap of a fatty acid used in the method of the present invention with drilling mud not containing the ammonium soap of a fatty acid as a seepage loss reducer. The tests were carried out in the same manner as Example I. The results of these tests are shown in Table IV.

TABLE IV

Efficiency After 16 Hours of Hot Rolling at 150° F.
Oil = Diesel Oil
Mud (Water-In-Oil Emulsion - 30:70 by volume)

| Test No. | Ammonium Soap of fatty acid (5 pounds per gallon of mud) | Method of Preparation of Ammonium Soap of Fatty Acid (See Example III) | Connate Water (% by volume of mud) | Screen Size Opening (microns) | Fluid Loss (cc.) |
|---|---|---|---|---|---|
| 1 | — | — | — | 7 | 5.0 |
| 2 | — | — | — | 45 | 2.3 |
| 3 | — | — | — | 105 | 3.0 |
| 4 | oleic | A | 2 | 7 | 0.0 |
| 5 | oleic | A | 2 | 45 | 0.0 |
| 6 | oleic | A | 2 | 105 | 2.0 |
| 7 | — | — | — | 7 | 4.7 |
| 8 | — | — | — | 45 | 2.1 |
| 9 | — | — | — | 105 | 2.5 |
| 10 | oleic | B | 2 | 7 | 3.4 |
| 11 | oleic | B | 2 | 45 | 0.0 |
| 12 | oleic | B | 2 | 105 | 0.0 |
| 13 | — | — | — | 7 | 4.8 |
| 14 | — | — | — | 45 | 2.0 |
| 15 | — | — | — | 105 | 2.4 |
| 16 | oleic | C | 2 | 7 | 4.6 |
| 17 | oleic | C | 2 | 45 | 0.4 |
| 18 | oleic | C | 2 | 105 | 0.6 |
| 19 | — | — | — | 7 | 5.8 |
| 20 | — | — | — | 45 | 13.2 |

TABLE IV-continued

Efficiency After 16 Hours of Hot Rolling at 150° F.
Oil = Diesel Oil

Mud (Water-In-Oil Emulsion - 30:70 by volume)

| Test No. | Ammonium Soap of fatty acid (5 pounds per gallon of mud) | Method of Preparation of Ammonium Soap of Fatty Acid (See Example III) | Connate Water (% by volume of mud) | Screen Size Opening (microns) | Fluid Loss (cc.) |
|---|---|---|---|---|---|
| 21 | — | — | — | 105 | 10.8 |
| 22 | lauric | B | 2 | 7 | 1.8 |
| 23 | lauric | B | 2 | 45 | 5.0 |
| 24 | lauric | B | 2 | 105 | 6.6 |

EXAMPLE V

Tests were carried out to test the rheological properties of muds containing diesel oil and no ammonium soap of a fatty acid and muds containing diesel oil and an ammonium soap of a fatty acid. The rheological properties were determined in accordance with API RP 13B. The results of these tests are shown in Table V.

TABLE V

Rheology After Hot-Rolling at 150° F. for 16 Hours
Base Muds = 70:30 Diesel Oil to Water Mud (Water-In-Oil Emulsion - 30:70 Volume Ratio)

| Test No. | Ammonium Soap of fatty acid (5 pounds per barrel of mud) | Method of Preparation of Ammonium Soap of a Fatty Acid - (See Example III) | Connate Water (% by volume of mud) | PV (cps) | YP #/100 ft.$^2$ | Gel Initial/ 10 minutes |
|---|---|---|---|---|---|---|
| 1 | — | — | — | 18 | 12 | 12/20 |
| 2 | oleic | A | — | 21 | 12 | 13/15 |
| 3 | oleic | A | 2 | 22 | 14 | 17/24 |
| 4 | — | — | — | 19 | 11 | 13/22 |
| 5 | oleic | B | — | 20 | 2 | 9/16 |
| 6 | oleic | B | 2 | 20 | 1 | 9/16 |
| 7 | — | — | — | 22 | 15 | 22/29 |
| 8 | oleic | C | — | 22 | 2 | 9/14 |
| 9 | oleic | C | 2 | 21 | 3 | 8/14 |
| 10 | — | — | — | 46 | 8 | 11/20 |
| 11 | lauric | B | — | 47 | 7 | 8/20 |
| 12 | lauric | B | 2 | 51 | 9 | 12/25 |

EXAMPLE VI

Drilling muds were prepared in order to compare the efficiency of the drilling muds containing ammonium laurate used in the method of the present invention with drilling muds not containing ammonium laurate as a fluid loss additive. The drilling muds comprised diesel oil or mineral oil, brine water, 7-9 pounds per barrel of emulsifier and a viscosifier.

Figure 2:
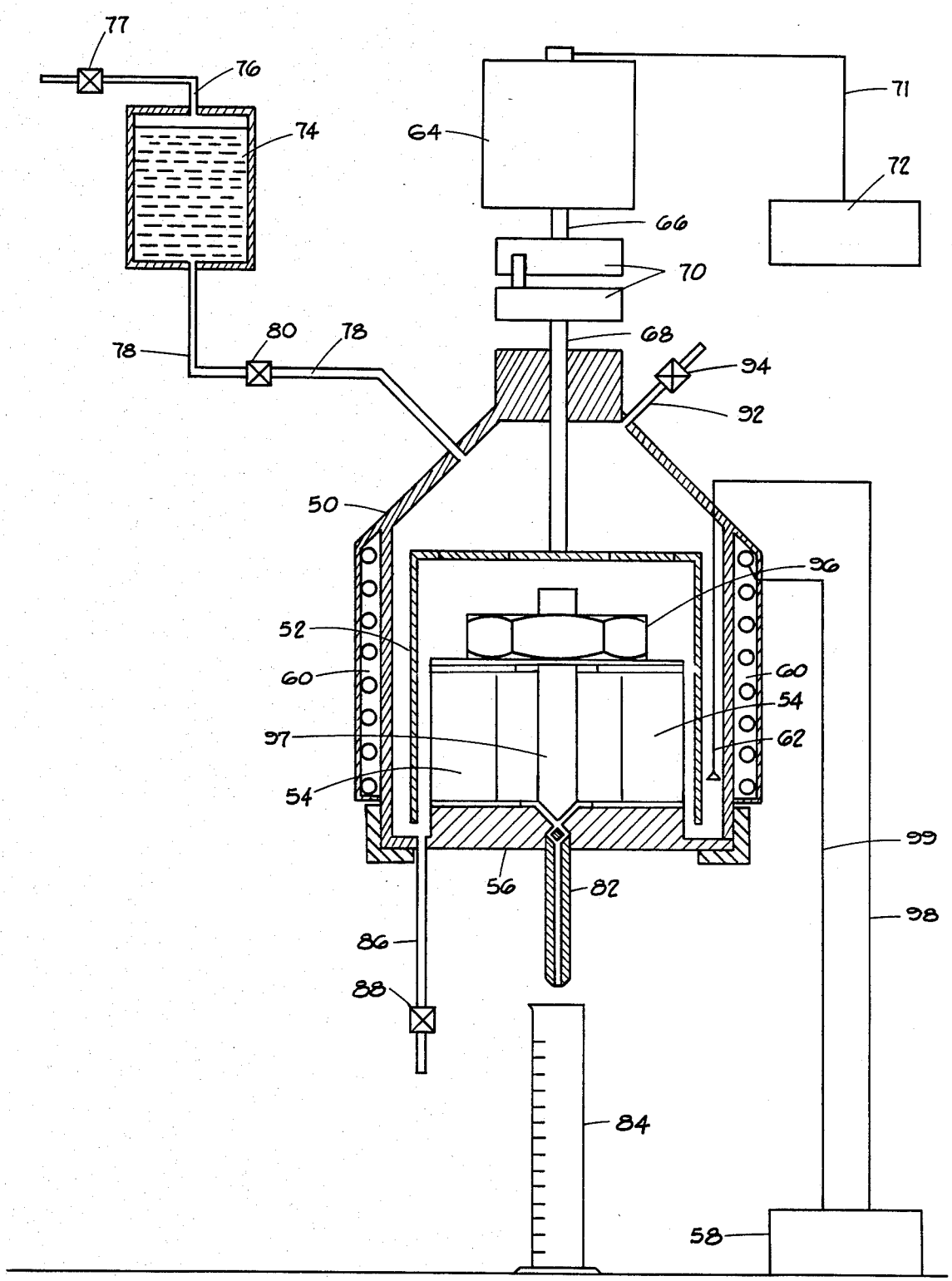
FIG. 2 is a cross-sectional view of the apparatus used to carry out the tests of Example VI.

A cross-sectional view of the apparatus used to carry out the tests is shown in FIG. 2. The apparatus comprised a vessel (50) equipped with a stirring means (52), air release means (92) connected to a valve (94), a core sample (54) which was secured to the vessel (50) by means of a holder (56) and a bolt (96) which was secured to rod (97). The apparatus was heated by means of heating element (60) which was connected to heat controller (58) by means of line (99). A thermocouple (62) connected to the heat controller (58) by means of line (98) regulated the heat of the vessel (50). The stirring apparatus (52) was rotated by means of an electric motor (64) and the motor (64) was connected to the rate controller means (72) by means of line (71). The shaft (66) of the electric motor (64) was secured to the shaft of stirring apparatus (68) by means of a holder (70). The speed of the motor (64) was varied by means of rate controller means (72). The drilling fluid to be tested was stored in reservoir (74) which was pressurized through pressure line (76) which was connected to a shut off valve (77). The drilling mud in the reservoir (74) was introduced into vessel (50) by means of line (78) which contained a shut-off valve (80).

The fluid filtering through core (54) passed through line (82) into graduated cylinder (84) where the amount of filtrate was measured. At the completion of the test, all drilling mud remaining in the vessel (50) was removed through line (86) which was connected to a shut off valve (88).

The tests were carried out by adding the drilling mud to be tested through line (78) into the vessel (50). The filtrate, from the drilling mud, passing through the core (54), was collected in the graduated cylinder (84). In order to minimize the change in solids of the mud during the tests, the drilling fluid was displaced from the vessel (50) during the tests at a rate of 100 ml. of drilling fluid per 10 ml. of filtrate collected in the graduated cylinder (84).

Berea sandstone cores initially saturated with connate or formation water containing monovalent and polyvalent cations, were used on the tests. Cores of two different sizes were used in the tests. The mud was filtered through the core and the amount of filtrate collected was measured every 30 minutes. The results of these tests are shown in Table VI.

TABLE VI

Efficiency Under Dynamic Conditions
at 150° F. and 300 psi
Base Muds = 70:30 Diesel Oil to Water
Mud (Water-In-Oil
Emulsion - 30:70 Volume Ratio)

| Test No. | Time (Minutes) | Ammonium Laurate (pounds per barrel of mud) | Core Size (Inches) | Volume of Filtrate (cc) |
|---|---|---|---|---|
| 1 | 30 | — | ¾ | 2.1 |
| 2 | 30 | 5 | ¾ | 0.6 |
| 3 | 60 | — | ¾ | 1.8 |
| 4 | 60 | 5 | ¾ | 0.6 |
| 5 | 90 | — | ¾ | 2.1 |
| 6 | 90 | 5 | ¾ | 0.6 |
| 7 | 120 | — | ¾ | 2.1 |
| 8 | 120 | 5 | ¾ | 1.5 |
| 9 | 150 | — | ¾ | 1.8 |
| 10 | 150 | 5 | ¾ | 1.8 |
| 11 | 30 | — | ⅞ | 3.0 |
| 12 | 30 | 5 | ⅞ | 1.8 |
| 13 | 60 | — | ⅞ | 2.7 |
| 14 | 60 | 5 | ⅞ | 0.6 |
| 15 | 90 | — | ⅞ | 2.1 |
| 16 | 90 | 5 | ⅞ | 0.6 |
| 17 | 120 | — | ⅞ | 2.1 |
| 18 | 120 | 5 | ⅞ | 1.0 |
| 19 | 150 | — | ⅞ | 1.7 |
| 20 | 150 | 5 | ⅞ | 1.0 |

From Table VI it can be seen that ammonium laurate was effective in reducing seepage loss by its reaction with the formation water. The efficiency of the ammonium laurate increased with increasing thickness of the core.

The invention is not limited to the above-described specific embodiments thereof; it must be understood, therefore, that the detail involved in the descriptions of the specific embodiments is presented for the purpose of illustration only, and that reasonable variations or modifications, which will be apparent to those skilled in the art, can be made in the invention without departing from the spirit and scope thereof.

What is claimed is:

1. A method of drilling an oil well in a subterranean formation said formation having connate water with monovalent and polyvalent cations comprising:
   a. circulating in the well during the drilling of a drilling fluid having a density from about 8.0 to about 25 pounds per U.S. gallon and comprising:
      (1) an oil-base liquid said liquid comprising from about 60 to about 99 percent by volume oil and about 1 to about 40 percent by volume water;
      (2) a seepage loss reducer present in the range of from about 1 to about 25 pounds per barrel of drilling fluid and comprising a powdered silicate having a molar ratio of silicon dioxide to alkali metal oxide in the range of from about 1.5:1 to about 3.3:1 wherein said alkali metal is selected from the group consisting of sodium, potassium and mixtures thereof; and,
      (3) a weighting agent present in an amount sufficient to produce a density of said drilling fluid of from about 8.0 to about 25.0 pounds per U.S. gallon;
      (4) an emulsifying agent present in the range of from about 0.1 percent to about 9.0 percent by weight of the weighting agent and the oil-base liquid and selected from the group consisting of a fatty acid, an amide derivative of a fatty acid and mixtures thereof;
   whereby said seepage loss reducer reacts with the monovalent and polyvalent cations to form a seal in the formation.

2. The method recited in claim 1 wherein the seepage loss reducer is a powdered amorphous silicate having a molar ratio of silicon dioxide to alkali metal oxide in the range of from about 2.0:1 to about 2.7:1.

3. The method recited in claim 2 wherein the oil is selected from the group consisting of crude oil, diesel oil, mineral oil, gasoline, and mixtures thereof.

4. The method recited in claim 3 wherein said seepage loss reducer is present in the range of from about 5 pounds to about 10 pounds of seepage loss reducer per barrel of drilling fluid.

5. The method recited in claim 4 wherein said weighting agent is selected from the group consisting of barites, iron oxides, calcium carbonate, and mixtures thereof.

6. The method recited in claim 1 wherein said seepage loss reducer is powdered amorphous silicate having a molar ratio of silicon dioxide to alkali metal oxide of about 2.5:1.

7. The method recited in claim 1 wherein said emulsifying agent comprises a mixture of dimerized oleic acid, oleic acid, and oleyl amide.

8. A method of drilling a well bore into subterranean formation containing water with monovalent and polyvalent cations and preventing loss into the formation of an oil-base drilling fluid having a density of from about 8.0 to about 25 pounds per U.S. gallon and used in the drilling comprising:
   a. adding to an oil-base liquid said liquid comprising from about 60 to about 99 percent by volume of oil and about 1 to about 40 percent by volume water, a weighting agent in an amount sufficient to produce a drilling fluid having a density of from about 8.0 to about 25.0 pounds per U.S. gallon, an emulsifying agent in the range of from about 0.1 percent to about 9.0 percent by weight of the weighting agent and the oil-base liquid and selected from the group consisting of a fatty acid, an amide derivative of a fatty acid and mixtures thereof and a seepage loss reducer in the range of from about 1 to about 25 pounds per barrel of drilling fluid and comprising a powdered silicate having a molar ratio of silicon dioxide to alkali metal oxide in the range of from about 1.5:1 to about 3.3:1 wherein said alkali metal is selected from the group consisting of sodium, potassium and mixtures thereof to form the drilling fluid; and
   b. circulating said drilling fluid in said well bore whereby the seepage loss reducer reacts with the monovalent and polyvalent cations to form a seal in the formation adjacent to the well bore.

9. The method recited in claim 8 wherein said seepage loss reducer is a powdered amorphous silicate having a molar ratio of silicon dioxide to alkali metal of about 2.5:1.

10. The method recited in claim 8 wherein the seepage loss reducer is a powdered amorphous silicate having a molar ratio of silicon dioxide to alkali metal oxide in the range of from about 2.0:1 to about 2.7:1.

11. The method recited in claim 10 wherein the oil is selected from the group consisting of crude oil, diesel oil, mineral oil, gasoline, and mixtures thereof.

12. The method recited in claim 11 wherein said seepage loss reducer is present in the range of from about 5 pounds to about 10 pounds per seepage loss reducer per barrel of drilling fluid.

13. The method recited in claim 12 wherein said weighting agent is selected from the group consisting of barites, iron oxides, calcium carbonate, and mixtures thereof.

14. The method recited in claim 12 wherein said emulsifying agent comprises a mixture of dimerized oleic acid, oleic acid and oleyl amide.

* * * * *

UNITED STATES PATENT AND TRADEMARK OFFICE
CERTIFICATE OF CORRECTION

PATENT NO. : 4,525,285

DATED : June 25, 1985

INVENTOR(S) : Adelina J. Son and Royal E. Loftin

It is certified that error appears in the above-identified patent and that said Letters Patent is hereby corrected as shown below:

Column 9, at line 10, delete the number "19" and insert therefore --149--.

Column 13, at line 45, delete the word "of".

Signed and Sealed this

Twenty-fourth Day of December 1985

[SEAL]

Attest:

DONALD J. QUIGG

Attesting Officer

Commissioner of Patents and Trademarks